United States Patent
Liang

(10) Patent No.: US 9,948,132 B2
(45) Date of Patent: Apr. 17, 2018

(54) WIRELESS CHARGING METHOD AND APPARATUS FOR HANDHELD MOBILE TERMINAL

(71) Applicant: ZTE Corporation, Shenzhen (CN)

(72) Inventor: Jingxiao Liang, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 198 days.

(21) Appl. No.: 14/894,741

(22) PCT Filed: Sep. 9, 2013

(86) PCT No.: PCT/CN2013/083136
§ 371 (c)(1),
(2) Date: Nov. 30, 2015

(87) PCT Pub. No.: WO2014/190635
PCT Pub. Date: Dec. 4, 2014

(65) Prior Publication Data
US 2016/0126774 A1    May 5, 2016

(30) Foreign Application Priority Data

May 31, 2013   (CN) .......................... 2013 1 0213150

(51) Int. Cl.
*H02J 7/02*         (2016.01)
*H02J 50/12*        (2016.01)
(Continued)

(52) U.S. Cl.
CPC ............... *H02J 7/025* (2013.01); *H02J 7/04* (2013.01); *H02J 17/00* (2013.01); *H02J 50/12* (2016.02); *H02J 50/27* (2016.02)

(58) Field of Classification Search
CPC ..................................... H02J 7/025
(Continued)

(56) References Cited

U.S. PATENT DOCUMENTS

2007/0285255 A1* 12/2007 Tsushima ............. G06K 7/0008
340/572.7
2011/0188677 A1    8/2011 Rothkopf et al.

FOREIGN PATENT DOCUMENTS

CN          1950914 A       4/2007
CN        101971453 A       2/2011
(Continued)

OTHER PUBLICATIONS

International Search Report for corresponding application PCT/CN2013/083136 filed Sep. 9, 2013; dated Feb. 27, 2014.
(Continued)

*Primary Examiner* — Thuan Do
(74) *Attorney, Agent, or Firm* — Cantor Colburn LLP

(57) ABSTRACT

Provided are a wireless charging method and a wireless charging apparatus for a handheld mobile terminal. The method includes: detecting a state of an earphone cord of the handheld mobile terminal in real time (S101); when it is detected that the earphone cord is in the to-be-charged twisted state, connecting the earphone cord, as an electricity receiving coil, to a charging apparatus (S102); after the earphone cord is connected as the electricity receiving coil to the charging apparatus, placing the handheld mobile terminal on or near a charging plate provided with an electricity transmitting coil to enable electromagnetic coupling (S103); and obtaining electric energy, by the handheld mobile terminal, through the electromagnetic coupling between the electricity transmitting coil and the electricity receiving coil, to wirelessly charge a battery of the handheld mobile terminal (S104). Convenience can be brought to a user and the user experience can be improved.

10 Claims, 4 Drawing Sheets

(51) Int. Cl.
*H02J 17/00* (2006.01)
*H02J 50/27* (2016.01)
*H02J 7/04* (2006.01)

(58) Field of Classification Search
USPC .......................................................... 320/108
See application file for complete search history.

(56) References Cited

FOREIGN PATENT DOCUMENTS

| CN | 101971457 A | 2/2011 |
|----|-------------|--------|
| CN | 102035267 A | 4/2011 |
| CN | 202068459 U | 12/2011 |
| CN | 202111764 U | 1/2012 |
| CN | 102377217 A | 3/2012 |
| CN | 102545326 A | 7/2012 |
| CN | 102611169 A | 7/2012 |

OTHER PUBLICATIONS

SIPO Office Action for corresponding application 2013102131506 dated Jul. 3, 2017; pp. 6.
Supplementai International Search Report for corresponding application EP13886114 dated Apr. 28, 2016; pp. 7.

\* cited by examiner

WIRELESS CHARGING METHOD AND APPARATUS FOR HANDHELD MOBILE TERMINAL

TECHNICAL FIELD

The present disclosure relates to a wireless terminal technology, and in particular to a wireless charging method and a wireless charging apparatus for a handheld mobile terminal.

BACKGROUND

Through wireless technology, various functions can be realized on digital products such as mobile phone, for example, Bluetooth headset, Wireless Fidelity (Wi-Fi) Internet access and the like. With the increasing development and improvement of technologies, wireless technologies in the related art can now realize more complicated functions, for example, wireless charging.

The wireless charging technology transfers charges over air between a charger and a device by virtue of magnetic resonance. Specifically, a coil and a capacitor form a resonance between the charger and the device, so as to realize the efficient electric-energy transfer.

At present, wireless charging apparatuses available on market refer to wireless chargers, which charge devices by the electromagnetic induction principle and of which the principle is similar to a transformer. One coil is deployed at the transmitting end and the receiving end respectively; the transmitting end coil is connected with a wired power supply to generate an electromagnetic signal, and the receiving end coil senses the electromagnetic signal from the transmitting end and generates a current to charge a battery.

Nowadays, handheld mobile terminals used by users include mobile phone, touch, tablet computer and so on. Wireless chargers only charging matched mobile phones cannot meet users' requirements. How to provide a more convenient use and an improved user experience is a problem to be solved.

SUMMARY

The embodiments of the present disclosure provide a wireless charging method and a wireless charging apparatus for a handheld mobile terminal.

According to one aspect of the embodiments of the present disclosure, a wireless charging method for a handheld mobile terminal is provided, including: detecting a state of an earphone cord of the handheld mobile terminal in real time; when it is detected that the earphone cord is in the to-be-charged twisted state, connecting the earphone cord, as an electricity receiving coil, to a charging apparatus; after the earphone cord is connected as the electricity receiving coil to the charging apparatus, placing the handheld mobile terminal on or near a charging plate provided with an electricity transmitting coil to enable electromagnetic coupling; and obtaining electric energy, by the handheld mobile terminal, through the electromagnetic coupling between the electricity transmitting coil and the electricity receiving coil, to wirelessly charge a battery of the handheld mobile terminal.

In an example embodiment, the earphone cord of the handheld mobile terminal is a coupling coil twisted into a Near Field Communication (NFC) antenna and is built in the handheld mobile terminal.

In an example embodiment, the state of the earphone cord of the handheld mobile terminal includes a to-be-charged twisted state, a standby twisted state and an earphone usage state.

In an example embodiment, before it is detected that the earphone cord is in the to-be-charged twisted state, the method further includes: the earphone cord contacting with an earplug slot contact disposed at a reset position of handheld mobile terminal.

In an example embodiment, when the handheld mobile terminal is placed near the charging plate provided with the electricity transmitting coil, the method further includes: horizontally moving the handheld mobile terminal to the charging plate through a driving device of the electricity transmitting coil.

In an example embodiment, the handheld mobile terminal obtaining the electric energy through the electromagnetic coupling between the electricity transmitting coil and the electricity receiving coil includes: transferring charges over air between the handheld mobile terminal and the charging plate using magnetic resonance; and obtaining electric energy, by the handheld mobile terminal, through the electromagnetic coupling between the electricity transmitting coil and the electricity receiving coil.

According to another aspect of the embodiments of the present disclosure, a wireless charging apparatus for a handheld mobile terminal is provided, including: a detection module, which is configured to detect a state of an earphone cord of the handheld mobile terminal in real time; a connection module, which is configured to connect the earphone cord, as an electricity receiving coil, to a charging apparatus when it is detected that the earphone cord is in the to-be-charged twisted state; an electromagnetic coupling module, which is configured to place the handheld mobile terminal on or near a charging plate provided with an electricity transmitting coil to enable electromagnetic coupling after the earphone cord is connected as the electricity receiving coil to the charging apparatus; and a wireless charging module, which is configured to obtain electric energy by the handheld mobile terminal through the electromagnetic coupling between the electricity transmitting coil and the electricity receiving coil, to wirelessly charge a battery of the handheld mobile terminal.

In an example embodiment, the connection module includes: a judgment unit, which is configured to judge whether the earphone cord is in the to-be-charged twisted state; a connection unit, which is configured to connect the earphone cord to the charging apparatus when it is judged that the earphone cord is in the to-be-charged twisted state; in an example embodiment, the electromagnetic coupling module includes: a placing unit, which is configured to place the handheld mobile terminal on the charging plate; a coupling unit, which is configured to electromagnetically couple the handheld mobile terminal with the charging plate.

In an example embodiment, the wireless charging module includes: an electricity receiving coil unit, which is configured to wirelessly receive the electric energy sent by the charging plate; a rectifying unit, which is configured to convert a received alternating current into a direct current which is able to be supplied for a battery; a charging unit, which is configured to wirelessly charge the battery of the handheld mobile terminal using the direct current.

Compared with the related art, the embodiments of the present disclosure have advantages as follows: wireless charging is realized through the twisting of a fully-automatically retractable wired earphone cord built in a handheld mobile terminal, thereby bringing convenience to a user and improving the user experience.

DETAILED DESCRIPTION OF THE EMBODIMENTS

The example embodiments of the present disclosure are described below in detail in conjunction with accompanying drawings; it should be noted that the example embodiments described below are only to illustrate but limit the present disclosure.

Figure 1:
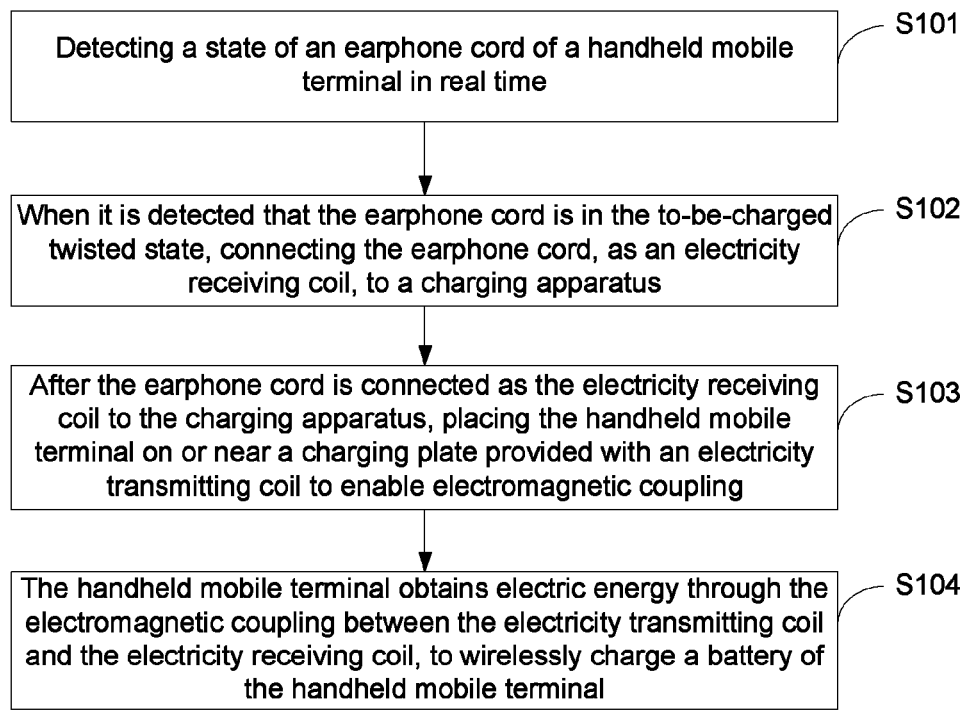
FIG. 1 is a schematic diagram showing the flow of a wireless charging method for a handheld mobile terminal according to an embodiment of the present disclosure.

According to an embodiment of the present disclosure, a wireless charging method for a handheld mobile terminal implemented through the twisting of an inbuilt earphone cord is provided. FIG. 1 is a schematic diagram showing the flow of a wireless charging method for a handheld mobile terminal according to the embodiment of the present disclosure. As shown in FIG. 1, the method includes the following steps S101 to S104.

S101: a state of an earphone cord of the handheld mobile terminal is detected in real time.

S102: when it is detected that the earphone cord is in the to-be-charged twisted state, the earphone cord is connected, as an electricity receiving coil, to a charging apparatus.

S103: after the earphone cord is connected as the electricity receiving coil to the charging apparatus, the handheld mobile terminal is placed on or near a charging plate provided with an electricity transmitting coil to enable electromagnetic coupling.

S104: the handheld mobile terminal obtains electric energy through the electromagnetic coupling between the electricity transmitting coil and the electricity receiving coil, to wirelessly charge a battery of the handheld mobile terminal.

In this embodiment, the earphone cord of the handheld mobile terminal may be a coupling coil twisted into an NFC antenna and is built in the handheld mobile terminal.

The state of the earphone cord of the handheld mobile terminal may include a to-be-charged twisted state, a standby twisted state and an earphone usage state.

Before it is detected that the earphone cord is in the to-be-charged twisted state, the method may further include: the earphone cord contacts with an earplug slot contact disposed at a reset position of handheld mobile terminal.

In this embodiment, when the handheld mobile terminal is placed near the charging plate provided with the electricity transmitting coil, the handheld mobile terminal is horizontally moved to the charging plate through a driving device of the electricity transmitting coil.

In this embodiment, the handheld mobile terminal obtaining the electric energy through the electromagnetic coupling between the electricity transmitting coil and the electricity receiving coil includes: charges are transferred over air between the handheld mobile terminal and the charging plate using magnetic resonance; and electric energy is obtained by the handheld mobile terminal through the electromagnetic coupling between the electricity transmitting coil and the electricity receiving coil.

Figure 2:
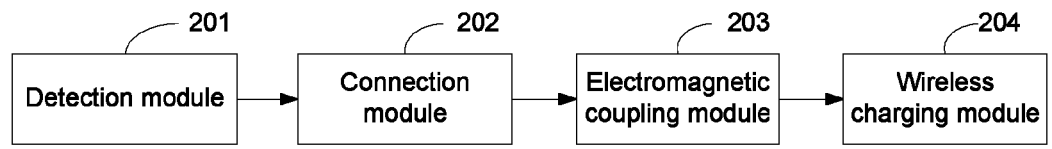
FIG. 2 is a schematic diagram showing a wireless charging apparatus for a handheld mobile terminal according to an embodiment of the present disclosure.

Corresponding to the above method, a wireless charging apparatus for a handheld mobile terminal implemented through the twisting of an inbuilt earphone cord is provided. FIG. 2 is a schematic diagram showing a wireless charging apparatus for a handheld mobile terminal according to an embodiment of the present disclosure. As shown in FIG. 2, the apparatus includes: a detection module 201, which is configured to detect a state of an earphone cord of the handheld mobile terminal in real time; a connection module 202, which is configured to connect the earphone cord, as an electricity receiving coil, to a charging apparatus when it is detected that the earphone cord is in the to-be-charged twisted state; an electromagnetic coupling module 203, which is configured to place the handheld mobile terminal on or near a charging plate provided with an electricity transmitting coil to enable electromagnetic coupling after the earphone cord is connected as the electricity receiving coil to the charging apparatus; and a wireless charging module 204, which is configured to obtain electric energy by the handheld mobile terminal through the electromagnetic coupling between the electricity transmitting coil and the electricity receiving coil, to wirelessly charge a battery of the handheld mobile terminal.

The connection module 202 includes: a judgment unit, which is configured to judge whether the earphone cord is in the to-be-charged twisted state; a connection unit, which is configured to connect the earphone cord to the charging apparatus when it is judged that the earphone cord is in the to-be-charged twisted state.

The electromagnetic coupling module 203 includes: a placing unit, which is configured to place the handheld mobile terminal on the charging plate; a coupling unit, which is configured to electromagnetically couple the handheld mobile terminal with the charging plate.

The wireless charging module 204 includes: an electricity receiving coil unit, which is configured to wirelessly receive the electric energy sent by the charging plate; a rectifying unit, which is configured to convert a received alternating current into a direct current which is able to be supplied for a battery; a charging unit, which is configured to wirelessly charge the battery of the handheld mobile terminal using the direct current.

Figure 3:
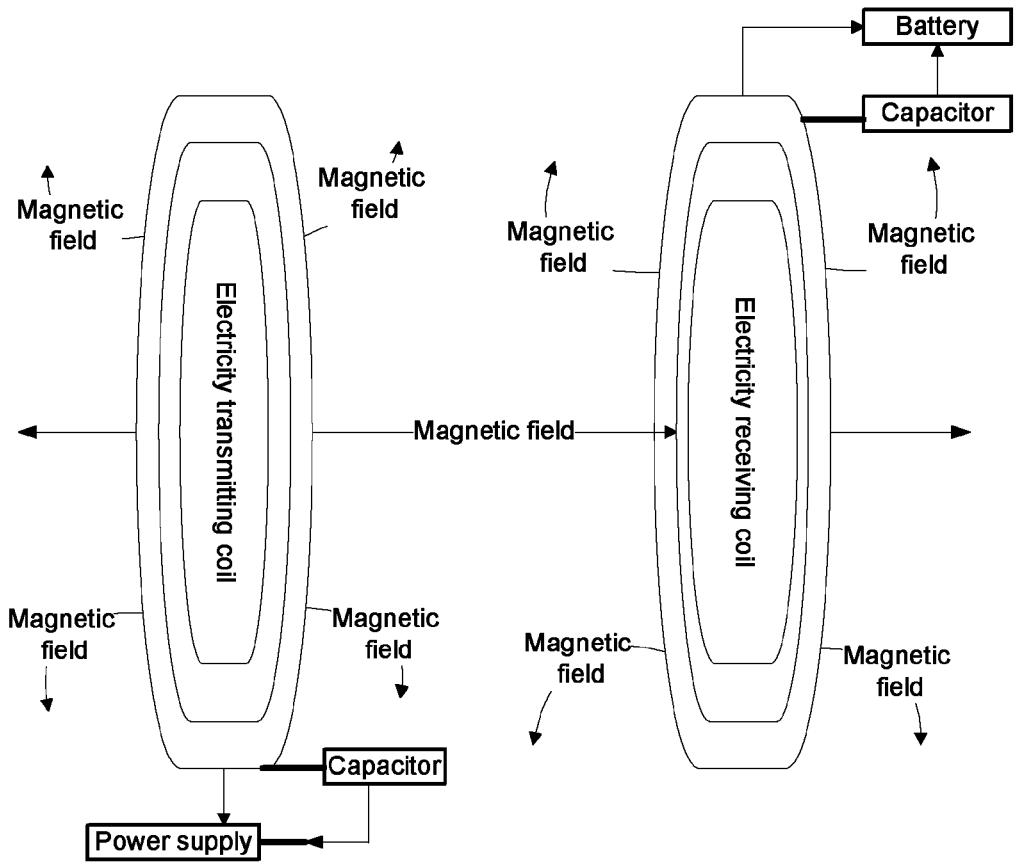
FIG. 3 is a schematic diagram showing the structure of magnetic resonance according to an embodiment of the present disclosure.

FIG. 3 is a schematic diagram showing the structure of magnetic resonance according to an embodiment of the present disclosure. As shown in FIG. 3, the structure includes: an electricity transmitting coil, an electricity receiving coil, a capacitor, a power supply and a battery. The twisted coil of the "wired earphone" cord is taken as the electricity receiving coil. The material of the "wired earphone" cord is replaced by the coupling coil material of the NFC antenna. The earphone cord is twisted into the coupling coil shape of the NFC antenna. This earphone is an inbuilt fully-automatically retractable "wired earphone"; the earphone reset position is provided with a special slot contact; during wireless charging, an identification module is started through software, so that the earphone slot forms a closed circuit with the battery on the other end of the earphone. A handheld mobile terminal with this "wired earphone" function is placed on a "charging plate without limiting terminal position" to be wirelessly charged. A small dense coil array (acting as the electricity transmitting coil) is provided inside the "charging plate without limiting terminal position" to generate a magnetic field. In addition, the internal electricity transmitting coil has a driving device, which can horizontally move on a plane, and according to the automatic detection of the position of the terminal, the handheld mobile terminal can be moved to the "charging plate without limiting terminal position" by virtue of the driving device. At this time, charges are transferred over air between the "charging plate without limiting terminal position" and the handheld mobile terminal by magnetic resonance; the coil (including the electricity transmitting coil and the electricity receiving coil) and the capacitor form a resonance between the "charging plate without limiting terminal position" and the handheld mobile terminal, to realize the efficient transfer of electric energy. In this way, wireless charging is realized.

Figure 4:
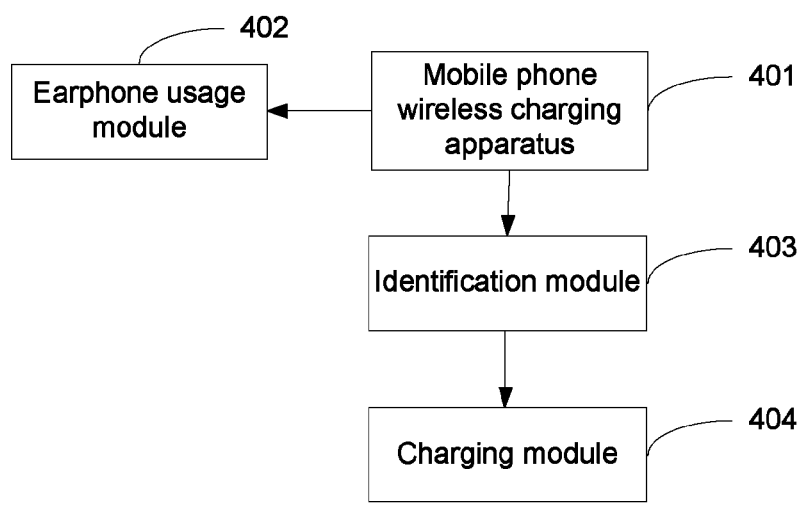
FIG. 4 is a schematic diagram of a handheld mobile terminal according to an embodiment of the present disclosure.

FIG. 4 is a schematic diagram of a handheld mobile terminal according to an embodiment of the present disclosure. As shown in FIG. 4, the handheld mobile terminal includes: a mobile phone wireless charging apparatus 401, an earphone usage module 402, an identification module 403 and a charging module 404. The mobile phone wireless charging apparatus 401 is configured to establish a wireless charging connection with the "charging plate without limiting terminal position". The earphone usage module 402 is configured to act as a common earphone when a user makes a call, watches videos or listens to music. The identification module 403 is configured to establish a wireless charging connection with the "charging plate without limiting terminal position" when the earphone cord is in a reset state; when a user needs to charge the handheld mobile terminal, the receiving end is allowed to be connected with the sending end to perform wireless charging; when the user does not need to charge the handheld mobile terminal, the earphone is in a normal standby state. The charging module 404 is configured to transfer charges using magnetic resonance, and to supply the acquired current to the battery of the handheld mobile terminal to conduct wireless charging.

Figure 5:
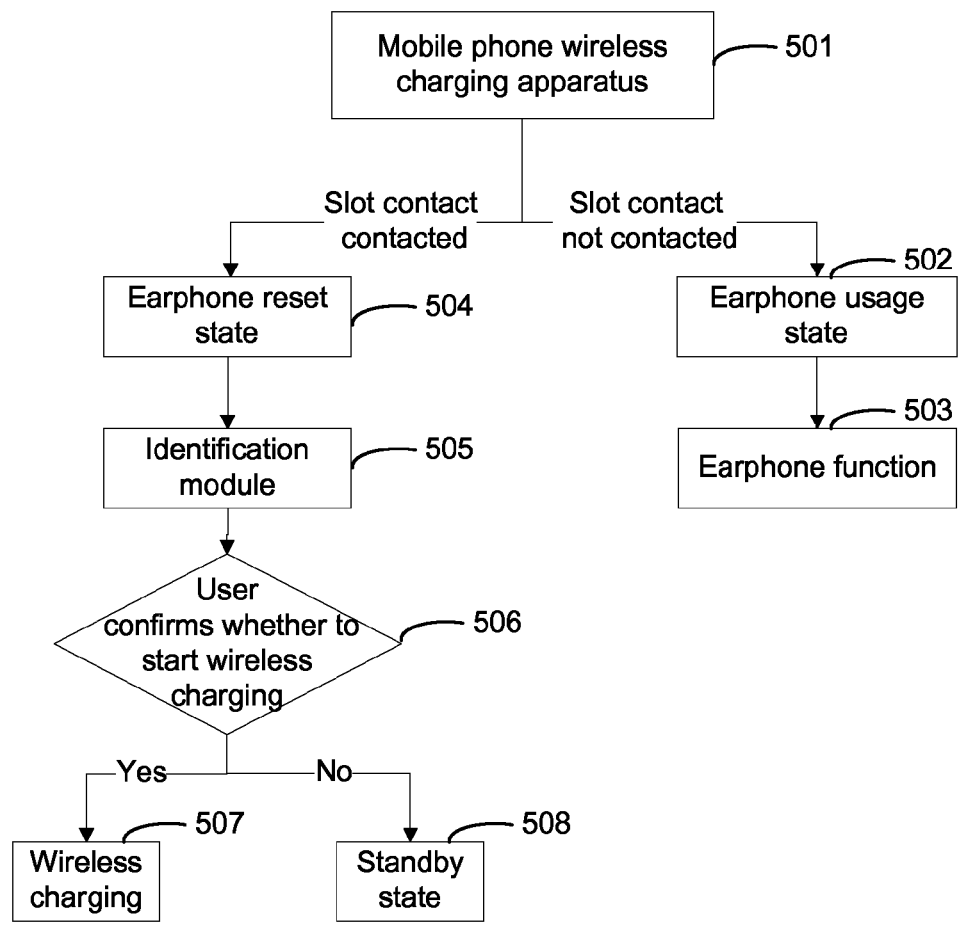
FIG. 5 is a chart showing the workflow of an earphone antenna built in a mobile phone according to an embodiment of the present disclosure.

FIG. 5 is a chart showing the workflow of an earphone antenna built in a mobile phone according to an embodiment of the present disclosure. As shown in FIG. 5, the workflow includes the following steps S501 to S504.

S501: when an earphone cord is in a mobile phone wireless charging apparatus 501, if it is detected that an earplug slot contact is currently not contacted, then the earphone is in an earphone usage state 502, and a user can directly pull out the earphone to hang it on ears to use it as a common earphone, for realizing an earphone function 503 such as making a call, watching videos or listening to music.

S502: when the user does not make a call, watch videos or listen to music, the earphone cord will be automatically retracted into the mobile phone wireless charging apparatus 501 and contact the earplug slot contact, then, the earphone is in an earphone reset state 504.

S503: the earphone cord, twisted into a coil shape, in the earphone reset state has established a wireless charging connection with a "charging plate without limiting terminal position"; an identification module 505 makes identification, and the user confirms whether to start wireless charging 506; if the user needs to charge the mobile terminal, wireless charging is allowed to be started and a connection is established, so as to perform wireless charging 507.

S504: if the user does not need to charge the mobile terminal, the connection of wireless charging is not allowed to be established; then the earphone cord is in a normal standby state 508.

According to the above steps, when a mobile phones needs to be charged and the earphone cord is in the earphone reset state, then a wireless charging connection between the mobile phone and the "charging plate without limiting terminal position" is allowed to be established to perform wireless charging.

Figure 6:
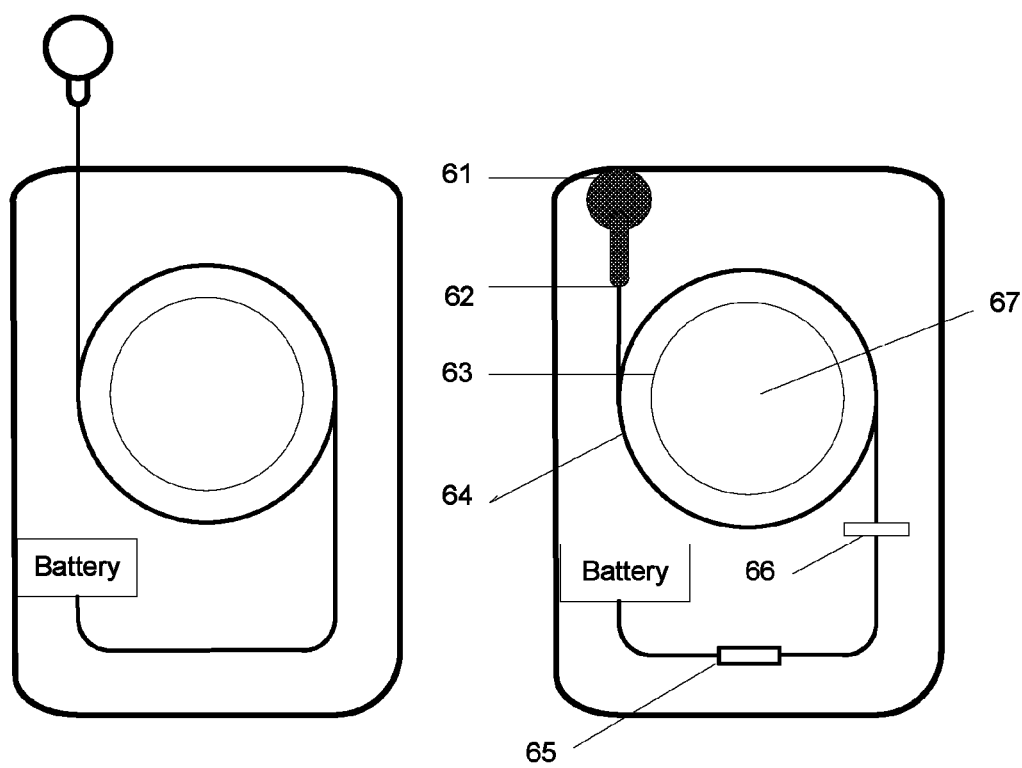
FIG. 6 is a diagram showing the wiring of an earphone antenna of a handheld mobile terminal according to an embodiment of the present disclosure.

FIG. 6 is a diagram showing the wiring of an earphone antenna of a handheld mobile terminal according to an embodiment of the present disclosure. As shown in FIG. 6, the structure includes: an earplug slot 61, an earphone antenna contact 62, a wire reel 63, an earphone cord 64, a charging module 65, an identification module 66 and a wireless charging apparatus 67. The left diagram shows that the earphone cord is pulled out and the wireless charging function is disabled; at this time, the earphone is used as a common earphone when in a connection state. The right diagram shows that the earphone is in an earphone reset state; if a user needs to charge a mobile terminal, the earplug slot contact is contacted to form a closed circuit with a battery; the charging connection is established to perform wireless charging when the identification module judges through software that the user needs to charge a mobile terminal; if the user does not need to charge a mobile terminal, the earphone cord is in a normal standby state.

The solution of the embodiments of the present disclosure is as follows:

(1) according to the coupling coil material of the NFC antenna, the earphone cord is made of this new-material, and is designed as an inbuilt fully-automatically retractable earphone of uniform standards applicable to different handheld mobile terminals. This special inbuilt earphone wire not only has a good signal transmission capacity, but also has a high tensile strength and a high wear resistance. When a user wants to make a call or watch a video, it is only needed to pull out the earphone from the earphone jack to hang it on ears. After the call or video are finished, the earphone will be automatically retracted into the wireless charging apparatus in the mobile phone.

(2) when the earphone is retracted into the wireless charging apparatus, that is, the earphone is in an earphone reset state, the twisting of the earphone wire realizes the necessary-sufficient condition of wireless charging connection between the wireless charging receiving end and the transmitting end formed by the "charging plate without limiting terminal position". At this time, the user may need to confirm whether to start wireless charging; if charging is needed, click the Yes button in notification to start the wireless charging state to perform short-distance wireless charging; if charging is not needed, click the No button in notification to enter into a normal standby state.

To sum up, in the embodiments of the present disclosure, a fully-automatically retractable "wired earphone" cord, which can be twisted into a coupling coil, is built in a handheld mobile terminal, it is only needed to place the handheld mobile terminal having this function on a "charging plate without limiting terminal position" to perform wireless charging. It is more convenient for a user and improves user experience.

Although the above paper gives a detailed description to the present disclosure, the present disclosure is not limited to this; those skilled in the art can make various modifications according to the principle of the present disclosure; therefore, all modifications made according to the principle of the present disclosure shall fall into the scope of protection defined by the claims of the present disclosure.

What is claimed is:

1. A wireless charging method for a handheld mobile terminal, comprising:
   detecting a state of an earphone cord of the handheld mobile terminal in real time;
   when it is detected that the earphone cord is in the to-be-charged twisted state, connecting the earphone cord, as an electricity receiving coil, to a charging apparatus;
   after the earphone cord is connected as the electricity receiving coil to the charging apparatus, placing the handheld mobile terminal on or near a charging plate provided with an electricity transmitting coil to enable electromagnetic coupling; and
   obtaining electric energy, by the handheld mobile terminal, through the electromagnetic coupling between the electricity transmitting coil and the electricity receiving coil, to wirelessly charge a battery of the handheld mobile terminal.

2. The method as claimed in claim 1, wherein the earphone cord of the handheld mobile terminal is a coupling coil twisted into a Near Field Communication (NFC) antenna and is built in the handheld mobile terminal.

3. The method as claimed in claim 1, wherein the state of the earphone cord of the handheld mobile terminal comprises: a to-be-charged twisted state, a standby twisted state and an earphone usage state.

4. The method as claimed in claim 3, wherein before it is detected that the earphone cord is in the to-be-charged twisted state, the method further comprises:
   the earphone cord contacting with an earplug slot contact disposed at a reset position of handheld mobile terminal.

5. The method as claimed in claim 1, wherein when the handheld mobile terminal is placed near the charging plate provided with the electricity transmitting coil, the method further comprises: horizontally moving the handheld mobile terminal to the charging plate through a driving device of the electricity transmitting coil.

6. The method as claimed in claim 1, wherein obtaining the electric energy, by the handheld mobile terminal, through the electromagnetic coupling between the electricity transmitting coil and the electricity receiving coil comprises:
   transferring charges over air between the handheld mobile terminal and the charging plate using magnetic resonance; and
   obtaining electric energy, by the handheld mobile terminal, through the electromagnetic coupling between the electricity transmitting coil and the electricity receiving coil.

7. A wireless charging apparatus for a handheld mobile terminal, comprising:
   a detection module, which is configured to detect a state of an earphone cord of the handheld mobile terminal in real time;
   a connection module, which is configured to connect the earphone cord, as an electricity receiving coil, to a charging apparatus when it is detected that the earphone cord is in the to-be-charged twisted state;
   an electromagnetic coupling module, which is configured to place the handheld mobile terminal on or near a charging plate provided with an electricity transmitting coil to enable electromagnetic coupling after the earphone cord is connected as the electricity receiving coil to the charging apparatus; and
   a wireless charging module, which is configured to obtain electric energy by the handheld mobile terminal through the electromagnetic coupling between the electricity transmitting coil and the electricity receiving coil, to wirelessly charge a battery of the handheld mobile terminal.

8. The apparatus as claimed in claim 7, wherein the connection module comprises:
   a judgment unit, which is configured to judge whether the earphone cord is in the to-be-charged twisted state;
   a connection unit, which is configured to connect the earphone cord to the charging apparatus when it is judged that the earphone cord is in the to-be-charged twisted state.

9. The apparatus as claimed in claim 7, wherein the electromagnetic coupling module comprises:
   a placing unit, which is configured to place the handheld mobile terminal on the charging plate;
   a coupling unit, which is configured to electromagnetically couple the handheld mobile terminal with the charging plate.

10. The apparatus as claimed in claim 7, wherein the wireless charging module comprises:
    an electricity receiving coil unit, which is configured to wirelessly receive the electric energy sent by the charging plate;
    a rectifying unit, which is configured to convert a received alternating current into a direct current which is able to be supplied for a battery;
    a charging unit, which is configured to wirelessly charge the battery of the handheld mobile terminal using the direct current.

* * * * *